United States Patent
Chisu et al.

(10) Patent No.: US 12,556,269 B2
(45) Date of Patent: Feb. 17, 2026

(54) INTER-SATELLITE HANDOVER OPTIMIZATION BASED ON TERRESTRIAL OBSTACLE OBSTRUCTION PREDICTION BY USER DEVICE IN OBSTRUCTION SCENARIOS

(71) Applicant: MOTOROLA MOBILITY LLC, Wilmington, DE (US)

(72) Inventors: Daniel C Chisu, Franklin Park, IL (US); Armin W Klomsdorf, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 372 days.

(21) Appl. No.: 18/449,472

(22) Filed: Aug. 14, 2023

(65) Prior Publication Data

US 2025/0062825 A1   Feb. 20, 2025

(51) Int. Cl.
*H04B 7/185*   (2006.01)

(52) U.S. Cl.
CPC ................................ *H04B 7/18541* (2013.01)

(58) Field of Classification Search
CPC .. H04B 7/18541; H04B 7/195; H04B 10/118; H04B 7/18513; H04B 7/18521; G01S 19/42; G01S 19/074; G01S 19/40; G01S 19/10; G01S 19/14; G01S 19/02; H01S 19/02
See application file for complete search history.

(56) References Cited

U.S. PATENT DOCUMENTS

| | | | |
|---|---|---|---|
| 2022/0116105 A1* | 4/2022 | Robinson | H04B 7/18517 |
| 2024/0305365 A1* | 9/2024 | Hiben | H04B 17/3913 |
| 2025/0199482 A1* | 6/2025 | Li | H04W 24/02 |

* cited by examiner

*Primary Examiner* — Fred A Casca
(74) *Attorney, Agent, or Firm* — Isidore PLLC

(57) ABSTRACT

A user device, a method, and a computer program product enable conditional requests by a user device based on predicting a radio link failure due to a terrestrial object. A communication subsystem of the user device receives communication service by a currently serving satellite of a constellation of satellites in low earth orbit (LEO). The serving satellite has a field of view encompassing a target area surrounding the user device. A controller of the communication device determines a location of the user device and tracks trajectories and corresponding fields of view of the constellation of LEO communication satellites. In response to predicting a radio link failure due to a terrestrial obstruction, the controller triggers completion of a conditional handover of radio link to a target satellite that is not predicted to have a radio link failure due to a terrestrial obstruction.

20 Claims, 13 Drawing Sheets

INTER-SATELLITE HANDOVER OPTIMIZATION BASED ON TERRESTRIAL OBSTACLE OBSTRUCTION PREDICTION BY USER DEVICE IN OBSTRUCTION SCENARIOS

BACKGROUND

1. Technical Field

The present disclosure relates generally to user devices that receive communication services from communication satellites, and in particular to user devices that receive communication services from a constellation of low earth orbit communication satellites.

2. Description of the Related Art

Mobile user communication devices incorporate communication capabilities within a device form factor that enables mobile use. In particular, the user devices connect with a communication environment of over-the-air or wireless terrestrial networks. However, in an example, certain sparsely populated or underdeveloped areas lack sufficient terrestrial networks to provide communication services. In another example, communication via terrestrial networks may become unavailable in a disaster or emergency situation, and restoring communication to the affected area via the terrestrial network may take long period of time. To address this deficiency with terrestrial networks, certain user devices use, or include an additional capability to use, non-terrestrial networks comprised of a constellation of satellites in low earth orbit (LEO). LEO satellites move with a high speed relative to fixed positions on Earth, providing a relatively short period of coverage even when capable of providing steerable beams rather than fixed beam reception and transmission. The satellites need to routinely handover a radio link established with the user device to another target satellite to prevent a radio link failure that results in degradation of a user experience. In some instances, non-terrestrial networks configure a user device to assist in a conditional handover procedure. The user device can take on computing and tracking responsibilities of determining when an orbit of a serving satellite is moving out of range. In an example, a serving satellite is only expected to have the user device within a field of view for a period of time, so the user device merely needs to be configured to trigger completion of the handover in response to the passage of time.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
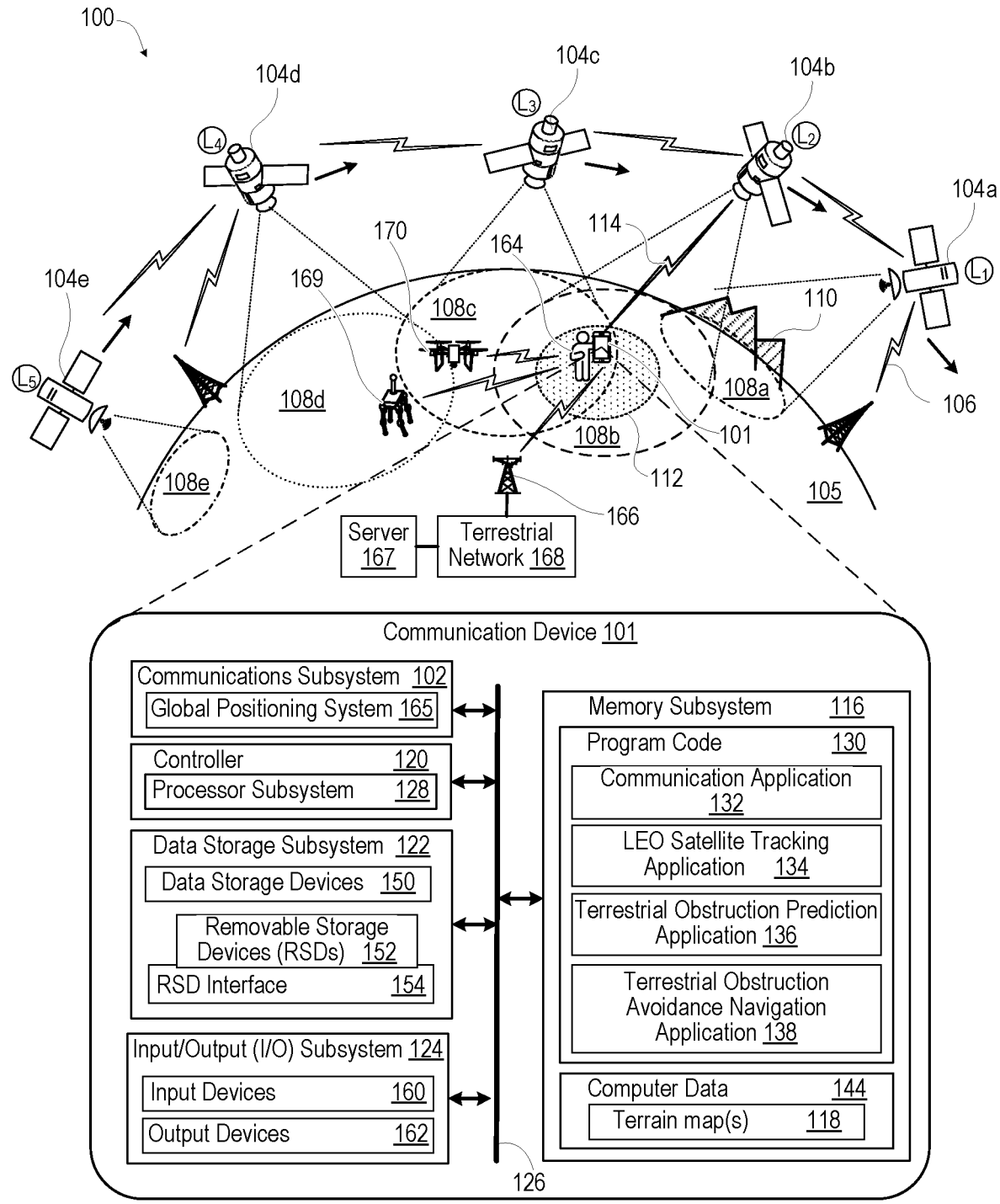
FIG. 1 presents a simplified functional block diagram of a user communication device that completes conditional handover of a radio link between the user device and a target satellite among a constellation of satellites in low earth orbit (LEO) based on predicting a radio link failure due to a terrestrial obstruction, according to one or more embodiments.

According to aspects of the present disclosure, a user device, a method, and a computer program product enable conditional handover of a radio link between a user device and a target satellite of a constellation of satellites in low earth orbit (LEO) based on predicting a radio link failure due to a terrestrial obstruction. The terrestrial obstruction causes the failure in a situation/location where the orbit of the satellite would otherwise be sufficiently overhead to provide coverage.

In one or more embodiments, the user device includes a communications subsystem communicatively connectable to a constellation of satellites in low earth orbit (LEO), each satellite configured to provide data communication services to the user device while the user device is within a field of view of a respective satellite. The satellites are communicatively coupled via an inter-satellite communication system with other satellites. The user device includes a memory that stores one or more topological terrain maps including terrestrial obstructions that can cause radio link failure between the user device and a satellite. A controller of the user device is communicatively coupled to the communications subsystem and the memory. The controller receives communication service by a serving satellite from the constellation, the serving satellite having a field of view encompassing a target area surrounding the user device. The controller determines a location of the user device. The controller tracks trajectories and corresponding fields of view of the constellation of satellites. The controller determines one or more target satellites of the constellation of satellites having respective field of views that encompasses a target area that encompasses the user device. The controller predicts, based on the one or more topological terrain maps, the user device location, and the movement of a satellite in its orbit towards an obstruction on the terrain map, whether a radio link failure will occur due to one or more terrestrial obstructions between the user device and respective ones of a currently serving satellite and the one or more target satellites that have a field of view encompassing the target area surrounding the user device. In response to predicting a radio link failure due to a terrestrial obstruction between the user device and the serving satellite, the controller triggers, via the communications subsystem, completion of a conditional handover of a radio link to a target satellite that is not predicted to have a radio link failure due to a terrestrial obstruction.

In one or more embodiments, the user device performs a conditional handover (CHO) procedure for inter-satellite handover optimization for LEO non-terrestrial network (NTN) in an obstruction scenario. The NTN configures the user device for the CHO procedure using a trigger criteria defined for terrestrial obstructions. The user device facilitates mobile use by executing CHO evaluation by continuously running an obstruction detector process in background, which process triggers events whenever any satellite tracked by the user device is predicted to be obstructed. In an example, an event that is triggered is to remove the obstructed satellite from a subset of the constellation of satellites being considered as a candidate for becoming a serving satellite. The detection logic uses topological terrain maps and takes into account the obstruction's height and width relative to the user device's location and satellite's information (based on ephemeris) and field of view (FoV) as the satellite travels in orbit. When an upcoming obstruction event is triggered for the serving satellite and a target satellite is clear of obstruction, the user device completes the CHO procedure by connecting to the target satellite. If all satellites are obstructed with no unobstructed target available, the user device identifies and presents, to a user of the user device, suggested three-dimensional geospatial coordinates of locations that can offer optimum coverage.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 presents a simplified functional block diagram of a communication device 101 that may operate as a mobile user device in communication environment 100, in which the features of the present disclosure are advantageously implemented. Communication device 101 includes communications subsystem 102 that is communicatively connectable to a constellation of satellites 104a-104e in low earth orbit (LEO). In addition to satellite communication capabilities, communication device 101 may or may not include other wireless and cellular RF communication capabilities. Communication device 101 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices.

Satellites 104a-104e are communicatively coupled via inter-satellite communication system 106 with other satellites 104a-104e. For clarity, satellites 104a-104e are in similar or identical orbits but spaced in time. For a particular location on geographic surface 105, satellites 104a-104e pass over in sequence. At a current time as depicted, first satellite 104a is at first orbital point "$L_1$". Second satellite 104b is at second orbital point "$L_2$". Third satellite 104c is at third orbital point "$L_3$". Fourth satellite 104d is at fourth orbital point "$L_4$". Fifth satellite 104e is at fifth orbital point "$L_5$". Subsequently, second satellite 104b will move to first orbital point "$L_1$" that is vacated by first satellite 104a. Third satellite 104c will move to second orbital point "$L_2$". Fourth satellite 104d will move to third orbital point "$L_3$". Fifth satellite 104e will move to fourth orbital point "$L_4$". Each satellite 104a-104e is configured to provide data communication services to communication device 101 while communication device 101 is within a field of view (FOV) 108a-108e of a respective satellite 104a-104e. In an example, first satellite 104a has first FOV 108a that is obstructed by terrain obstructions 110 prior to advancing beyond target area 112 that encompasses communication device 101. Terrain obstructions 110 can include natural geological formations, large plants, such as trees, and artificial manmade obstacles, such as buildings and infrastructure. Second satellite 104b follows first satellite 104a and has second FOV 108b that currently encompasses target area 112, enabling second satellite 104b to be a serving satellite. Third satellite 104c follows second satellite 104b and has third FOV 108c that currently includes communication device 101 and will shortly encompass target area 112, enabling third satellite 104c to be a target satellite for a handover of radio link 114 with communication device 101. Fourth satellite 104d follows third satellite 104c and has fourth FOV 108d that will subsequently be in position to encompass target area 112, as the fourth satellite 104d moves towards orbit location $L_2$ following third satellite 104c. Fifth satellite 104e follows fourth satellite 104d and has fifth FOV 108e that will subsequently be in position to encompass target area 112 after fourth satellite 104d.

To avoid a radio link failure and loss of communication services, communication device 101 may be configured by a serving satellite (e.g., second satellite 104b) to predict that terrain obstruction 110 will interfere with radio link 114 when second satellite 104b approaches orbit location (L1). In particular, memory subsystem 116 stores one or more topological terrain maps 118 that include data characterizing terrestrial obstructions 110 that can cause radio link failure between communication device 101 and respective satellites 104a-104e as the satellite passes over location $L_1$. Controller 120 of communication device 101 predicts radio link failures by a tracking satellites 104a-104e and determining whether topological terrain maps 118 indicate a terrain obstruction with particular satellites 104a-104e that would otherwise have an unobstructed FOV that would encompass the target area of communication device 101.

In addition to communications subsystem 102, memory subsystem 116, and controller 120, communication device 101 may include data storage subsystem 122 and input/output (I/O) subsystem 124. To enable management by controller 120, system interlink 126 communicatively connects controller 120 with communications subsystem 102, memory subsystem 116, data storage subsystem 122, and I/O subsystem 124. System interlink 126 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 126) are illustrated in FIG. 1, it is to be understood that more, fewer, or different interconnections may be present in other embodiments.

Controller 120 includes processor subsystem 128, which includes one or more central processing units (CPUs) or data processors. Processor subsystem 128 can include one or more digital signal processors that can be integrated with data processor(s). Processor subsystem 128 can include other processors such as auxiliary processor(s) that may act as a low power consumption, always-on sensor hub for physical sensors. Controller 120 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Memory subsystem 116 stores program code 130 for execution by processor subsystem 128 to provide the functionality described herein. Program code 130 includes applications such as communication application 132 that is configurable for triggering a conditional handover of a radio link, LEO satellite tracking application 134, terrain obstruction prediction application 136, and terrain obstruction avoidance navigation application 138. These applications may be software or firmware that, when executed by controller 120, configures communication device 101 to provide functionality described herein. In one or more embodiments, several of the described aspects of the present disclosure are provided via executable program code of applications executed by controller 120. In one or more embodiments, program code 130 may be integrated into a distinct chipset or hardware module as firmware that operates separately from executable program code. Portions of program code 130 may be incorporated into different hardware components that operate in a distributed or collaborative manner. Implementation of program code 130 may use any known mechanism or process for doing so using integrated hardware and/or software, as known by those skilled in the art. Memory subsystem 116 further includes operating system (OS), firmware interface, such as basic input/output system (BIOS) or Uniform Extensible Firmware Interface (UEFI), and firmware, which also includes and may thus be considered as program code 130.

Program code 130 may access, use, generate, modify, store, or communicate computer data 144, such as terrain map(s) 118. Computer data 144 may incorporate "data" that originated as raw, real-world "analog" information that consists of basic facts and figures. Computer data 144 includes different forms of data, such as numerical data, images, coding, notes, and financial data. Computer data 144 may originate at communication device 101 or be retrieved by communication device 101 from a second device, such as a network server, to which communication device 101 can communicatively connect. Communication device 101 may store, modify, present, or transmit computer data 144. Computer data 144 may be organized in one of a number of different data structures. Common examples of computer data 144 include video, graphics, text, and images. Computer data 144 can also be in other forms of flat files, databases, and other data structures.

In one or more embodiments, controller 120, via communications subsystem 102, performs multiple types of cellular over-the-air (OTA) or wireless communication such as using a Bluetooth connection, or other personal access network (PAN) connection. In one or more embodiments, communications subsystem 102 communicates via a wireless local area network (WLAN) link using one or more IEEE 802.11 WLAN protocols. In one or more embodiments, communications subsystem 102 receives downlink channels from global positioning system (GPS) satellites to obtain geospatial location information. Communications subsystem 102 may communicate via an over-the-air (OTA) cellular connection with radio access networks (RANs).

Data storage subsystem 122 of communication device 101 includes data storage device(s) 150. Controller 120 is communicatively connected, via system interlink 126, to data storage device(s) 150. Data storage subsystem 122 provides program code 130 and computer data 144 stored on non-volatile storage that is accessible by controller 120. For example, data storage subsystem 122 can provide a selection of program code 130 and computer data 144. These applications can be loaded into memory subsystem 116 for execution/processing by controller 120. In one or more embodiments, data storage device(s) 150 can include hard disk drives (HDDs), optical disk drives, and/or solid-state drives (SSDs), etc. Data storage subsystem 122 of communication device 101 can include removable storage device(s) (RSD(s)) 152, which is received in RSD interface 154. Controller 120 is communicatively connected to RSD 152, via system interlink 126 and RSD interface 154. In one or more embodiments, RSD 152 is a non-transitory computer program product or computer readable storage device. Controller 120 can access data storage device(s) 150 or RSD 152 to provision communication device 101 with program code 130 and computer data 144.

I/O subsystem 124 may include input devices 160 such as a microphone, image capturing devices, and touch input screens, keys or buttons. I/O subsystem 124 may include output devices 162 such as audio output devices, lights, displays, and vibratory or haptic output devices.

According to aspects of the present disclosure, communication device 101, via communication subsystem 102, receives communication service by a serving satellite (e.g., second satellite 104b) from among the constellation of satellites 104a-104e. For clarity, a single serving satellite (e.g., second satellite 104b) is depicted. In one or more embodiments, communication device 101 may receive concurrent communication service from more than one satellite. In an example, communication device 101 may participate in a soft handover in which active links are concurrently established with two or more satellites. With continued reference to FIG. 1, the serving satellite has FOV 108b encompassing target area 112 surrounding communication device 101. In one or more embodiments, communication device 101 is a mobile user device that is carried by user 164. Controller 120 determines a location of communication device 101, based on input from GPS module 165 or other location sensing mechanism(s). Controller 120 receives or accesses associated LEO satellite data and tracks trajectories and corresponding FOV 108a-108e of the constellation of satellites 104a-104e. In an example, while in range of radio access network 166, communication device 101 is provided by server 167 accessed via terrestrial network 168 with data about satellites 104a-104e. In another example, communication device 101 scans for signals broadcast by satellites 104a-104e. Controller 120 determines one or more target satellites (e.g., third satellite 104c) of the constellation of satellites 104a-104e having respective FOVs (e.g., 108c) that encompasses target area 112, which includes communication device 101. Controller 120 determines, based on one or more topological terrain maps 118, the device location relative to movement of a satellite in orbit towards an obstruction on the terrain map, and predicts whether a radio link failure will occur due to one or more terrestrial obstructions being positioned between communication device 101 and respective ones of a currently serving satellite (104b) and the one more target satellites (104c) that have an FOV (108b and 108c) encompassing target area 112 surrounding communication device 101. Communication device 101 is mobile, so controller 120 periodically updates device location. In response to predicting a radio link failure due to terrestrial obstruction 110 between communication device 101 and the serving satellite (e.g., second satellite 104b), controller 120 triggers, via communications subsystem 102, completion of a conditional handover of a radio link 114 to a target satellite (e.g., third satellite 104c) that is not predicted to have a radio link failure due to terrestrial obstruction 110. Communication device 101 may have more than one available target satellite. Communication device 101 may rank selection of a target satellite based on one or more factors such as proximity to the target satellite and longest available duration of coverage.

In one or more embodiments, communications subsystem 102 is communicatively coupled to terrestrial drone 169 or aerial drone 170 that is configured to act as an RF communications relay between communication device 101 and serving satellite 104b. Terrestrial drone 169 or aerial drone 170 may be sent to the three-dimensional coordinates of one or more locations around the user device that are not subject to a prediction of a radio link failure due to a terrestrial obstruction with all target satellites to act as an RF repeater or relay. Alternatively, or in addition to determining the three-dimensional coordinates of one or more locations on geographic surface 105 around the user device that are not subject to a prediction of a radio link failure due to a terrestrial obstruction with all target satellites, controller 120 also considers airborne locations where terrestrial obstruction shadowing of aerial drone 170 while airborne occurs. Controller 120 identifies closest locations where aerial drone 170 is not shadowed by terrestrial obstructions and can act as an RF relay or repeater for satellite communications to maintain coverage for communication device 101. Additional description of use of aerial drone is described below with regard to FIGS. 6, 7, and 9.

Figure 2:
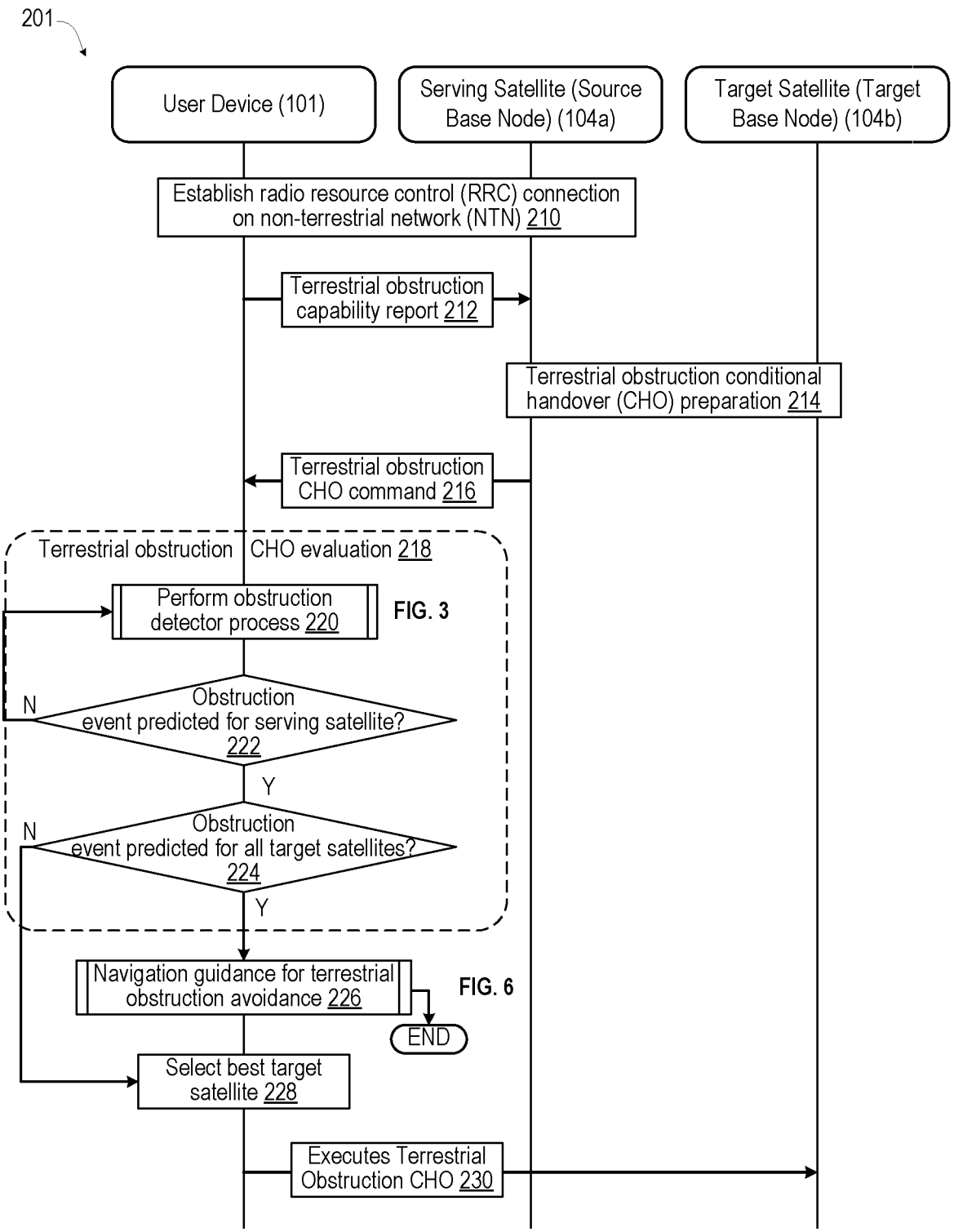
FIG. 2 presents a communication timing diagram of a procedure for terrain obstruction triggered conditional handover, according to one or more embodiments.

Various aspects of the following figures are presented with continuing reference to the features of FIG. 1, and like reference numbers in later figures are assumed to refer to the same or similar features in a preceding figure. FIG. 2 is a communication timing diagram of procedure 201 for terrain obstruction triggered conditional handover. Procedure 201 includes communication between a user device, such as communication device 101, a serving satellite acting as a source base node (e.g., second satellite 104b), and a target satellite acting as target base node (e.g., third satellite 104c). At process block 210, user device establishes a radio resource control (RRC) connection on a non-terrestrial network (NTN). At process block 212, user device communicates a terrestrial obstruction capability report to the serving satellite. In an example, the user device indicates that the user device is provisioned with terrain maps that include terrain obstructions. The user device further indicates a capability to perform tracking and prediction computations necessary to predict radio link failures due to terrain obstructions. At process block 214, serving satellite and target satellite communicate for terrestrial obstruction conditional handover (CHO) preparation. At process 216, serving satellite communicates a terrestrial obstruction CHO command to user device to configure user device to perform tracking and prediction computations necessary to predict radio link failures due to terrain obstructions. At process 218, user device performs terrestrial obstruction evaluation at least in part by performing obstruction detector process 220, which is described below with regard to FIG. 3. Based on results of obstruction detector process 220, user device determines whether a radio link failure due a terrain obstruction event is predicted for the serving satellite (decision block 222). In response to determining that a terrain obstruction event is not predicted, user device continues performing detector process 220. In response to predicting a radio link failure due to a terrestrial obstruction in decision block 222, user device determines whether an obstruction event is predicted for all target satellites that otherwise would be in an orbital position that provides coverage of user device (decision block 224). In response to determining that all target satellites are predicted to be obstructed by terrain, user device performs navigation guidance for terrestrial obstruction avoidance procedure 226, which is described below regarding FIG. 6. Then, procedure 201 ends. In response to determining that at least one target satellite is not predicted to be obstructed by terrain in decision block 224, at process 228, user device selects the best target satellite, i.e., the target satellite that is sufficiently close in orbit for satisfactory signal strength and has a longest predicted coverage time. At process 230, user device executes terrestrial obstruction CHO to the selected target satellite to trigger completion of CHO based on a terrain obstruction. Then, procedure 201 ends.

Figure 3:
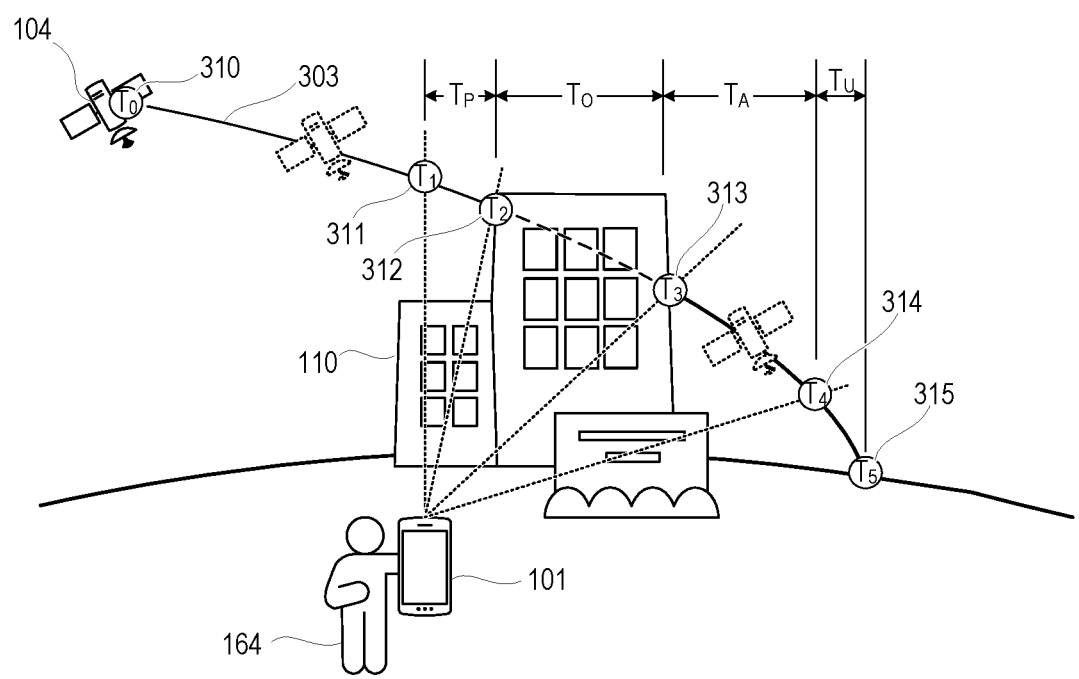
FIG. 3 illustrates a scenario of a temporary obstruction to a radio link between a user device and a serving satellite, according to one or more embodiments.

FIG. 3 illustrates a scenario of a temporary obstruction posed by terrain obstruction 110 to a radio link between a user device, such as communication device 101, and satellite 104. Communication device 101 tracks orbit 303 of satellite 104 from spatial point 310 reached at a current time "$T_0$" to five subsequent spatial points 311-315, respectively, as a function of times "$T_1$", "$T_2$", "$T_3$", "$T_4$", and "$T_5$". At first point 311 reached at time $T_1$, satellite 104 is approaching terrain obstruction 110 from the vantage point of communication device 101. At second spatial point 312 reached at time $T_2$, satellite 104 begins to be obstructed by terrain obstruction 110 from the vantage point of communication device 101. The time difference between times $T_1$ and $T_2$ is proximity period of time "$T_P$." At third spatial point 313 reached at time $T_3$, satellite 104 begins to be unobstructed again from the vantage point of communication device 101. Between times $T_2$ and $T_3$, an obstructed period of time "$T_O$" elapses which is compared to a threshold radio link failure period of time "$T_{RLF}$". When "$T_O$" is shorter than "$T_{RLF}$", radio link failure does not occur and communication resumes. When "$T_O$" is longer than "$T_{RLF}$", radio link failure occurs with a resulting interruption in satellite communication. By predicting that obstructed period of time "$T_O$" is longer than "$T_{RLF}$", communication device 101 may trigger terrain obstruction CHO completion to avoid radio link failure. At fourth spatial point 314 reached at time $T_4$, satellite 104 is no longer overhead to have a field of view that includes communication device 101. At fifth spatial point 315 reached at time $T_5$, satellite 104 goes below the horizon.

In one or more embodiments, the terrain obstruction is performed according to a timer such as evaluation timer "$T_E$", to avoid rapid evaluations changing back and forth between obstructed and unobstructed, with corresponding network overhead as a result. The timer (threshold radio link failure period of time "$T_{RLF}$") may be set to a value that is longer than the time required for a radio link failure to occur. In one or more embodiments, threshold radio link failure period of time "$T_{RLF}$" may be set for multiples of the time required for a radio link failure to occur.

With reference to the flow charts, which are presented by FIGS. 4, 7, 8, and 9, the descriptions of method 400 (FIG. 4), method 700 (FIG. 7) method 800 (FIG. 8), and method 900 (FIG. 9) are provided with general reference to the specific components illustrated within the preceding FIGS. 1, 2, 3, 5A-5B, and 6. Specific components referenced in method 400 (FIG. 4), method 700 (FIG. 7) method 800 (FIG. 8), and method 900 (FIG. 9) may be identical or similar to components of the same name used in describing preceding FIGS. 1, 2, 3, 5A-5B, and 6. In one or more embodiments, controller 120 (FIG. 1) configures communication device 101 (FIGS. 1, 2, 3, 5A-5B, and 6) to provide the described functionality of method 400 (FIG. 4), method 700 (FIG. 7), method 800 (FIG. 8), and method 900 (FIG. 9).

Figure 4A:
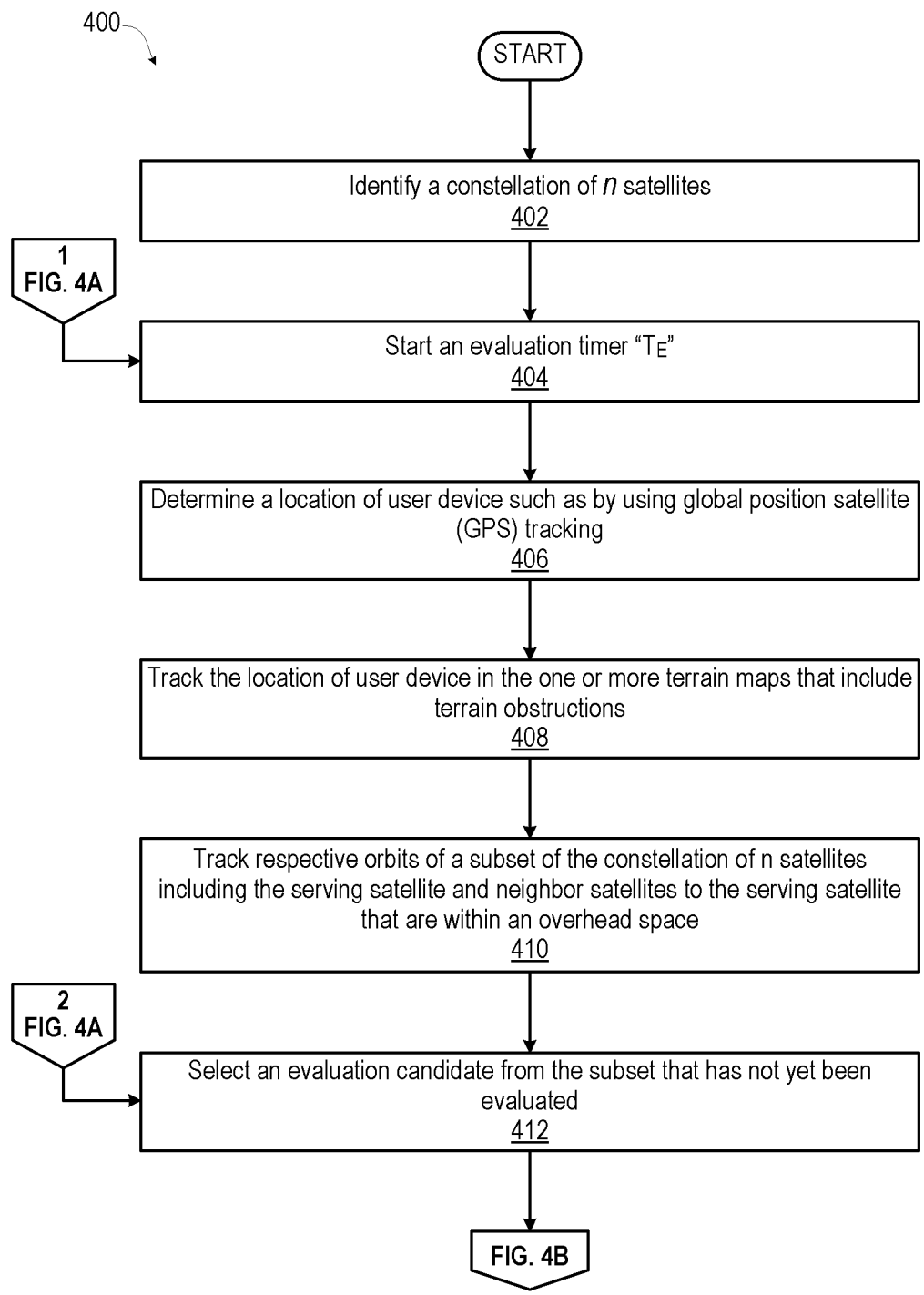
FIGS. 4A-4B (collectively "FIG. 4") are a flow diagram presenting a method for completing an obstruction detecting process, according to one or more embodiments.
Figure 4B:
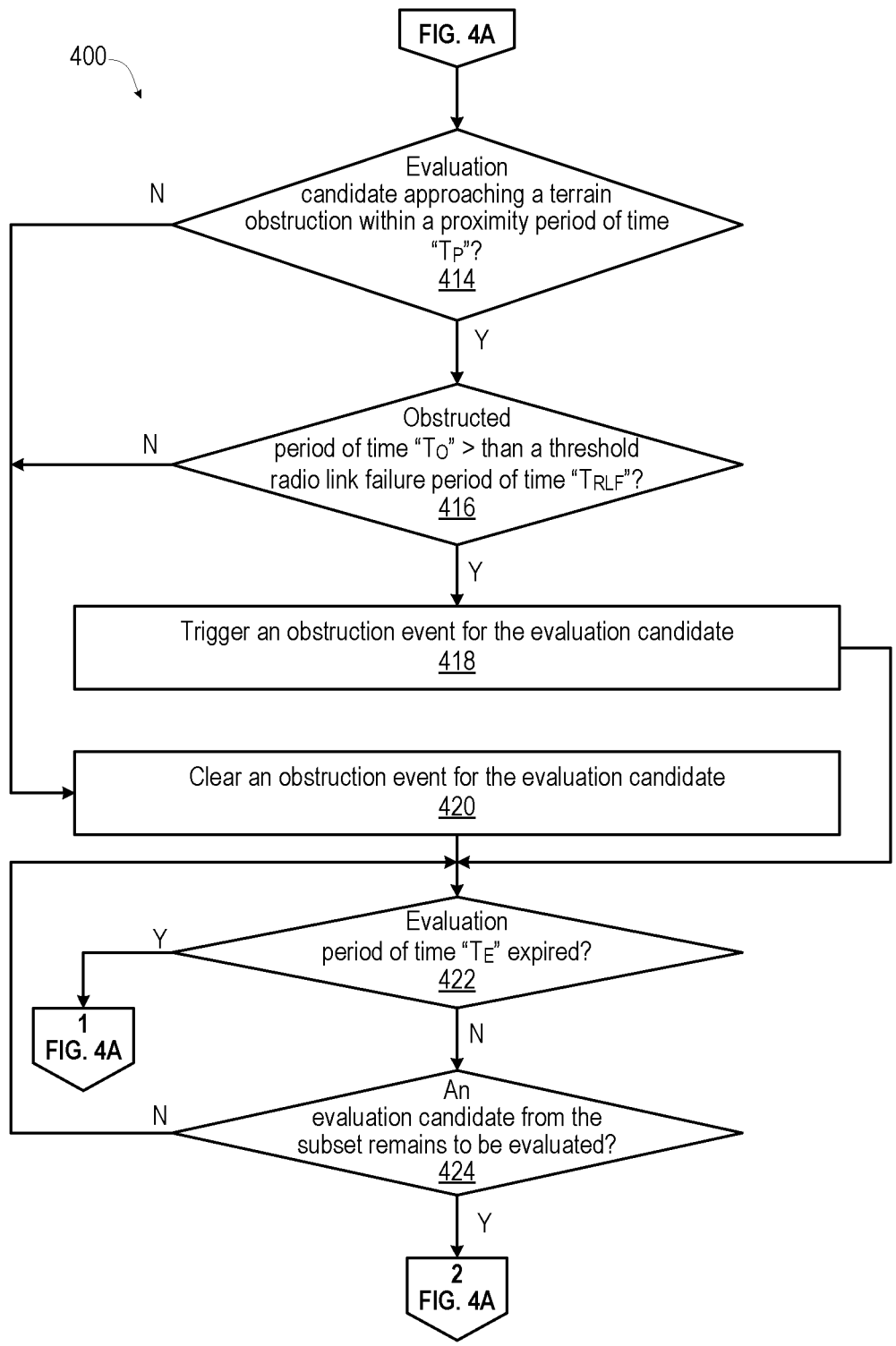

FIGS. 4A-4B (collectively "FIG. 4") are a flow diagram presenting method 400 for performing the obstruction detection process. With reference to FIG. 4A, method 400 includes identifying a constellation of n satellites (block 402). Method 400 includes starting an evaluation timer "$T_E$" (block 404). Method 400 includes determining a location of user device such as by using global position satellite (GPS) tracking (block 406). Method 400 includes tracking the location of user device in the one or more terrain maps that include terrain obstructions (block 408). Method 400 includes tracking respective orbits of a subset of the constellation of n satellites including the serving satellite and neighbor satellites to the serving satellite that are within an overhead space (block 410). Method 400 includes selecting an evaluation candidate from the subset that has not yet been evaluated (block 412). Then method 400 proceeds to block 414 of FIG. 4B.

With reference to FIG. 4B, method 400 includes determining whether the evaluation candidate is approaching a terrain obstruction within a proximity period of time "$T_P$" (decision block 414). In an example, obstruction detection logic is based on a terrain three-dimensional topological mapping data to account for height and width of the terrain obstruction relation to the location of the user device and a field of view (FOV) of the next serving or target satellite being evaluated. In response to determining that the next serving or target satellite is approaching a terrain obstruction within the proximity period of time "$T_P$", method 400 includes determining whether obstructed period of time "$T_O$" in which the orbit of the next serving or target satellite being evaluated will be obstructed by the terrain obstruction is greater than a threshold radio link failure period of time "$T_{RLF}$" (decision block 416). In response to determining that the obstructed period of time "$T_O$" in which the orbit of the next serving or target satellite being evaluated will be obstructed by the terrain obstruction is greater than the threshold radio link failure period of time "$T_{RLF}$", method 400 includes triggering an obstruction event for the evaluation candidate being evaluated (block 418).

In response to determining that the evaluation candidate is not approaching a terrain obstruction within the proximity period of time "$T_P$" in decision block 414 or in response to determining that obstructed period of time "$T_O$" in which the orbit of the evaluation candidate will be obstructed by the terrain obstruction is not greater than (i.e., less than or equal to) the threshold radio link failure period of time "$T_{RLF}$" in decision block 416, method 400 includes clearing an obstruction event for the evaluation candidate (block 420). After either block 418 or block 420, method 400 includes determining evaluation period of time "$T_E$" has expired (decision block 422). In response to determining that the evaluation period of time "$T_E$" has expired, method 400 returns to block 404 (FIG. 4A). In response to determining that the evaluation period of time "$T_E$" has not expired, method 400 includes determining whether an evaluation candidate remains to be evaluated (decision block 424). In response to determining that an evaluation candidate remains to be evaluated, method 400 returns to block 414 (FIG. 4A). In response to determining that no evaluation candidate remains to be evaluated, method 400 returns to decision block 424.

Figure 5A:
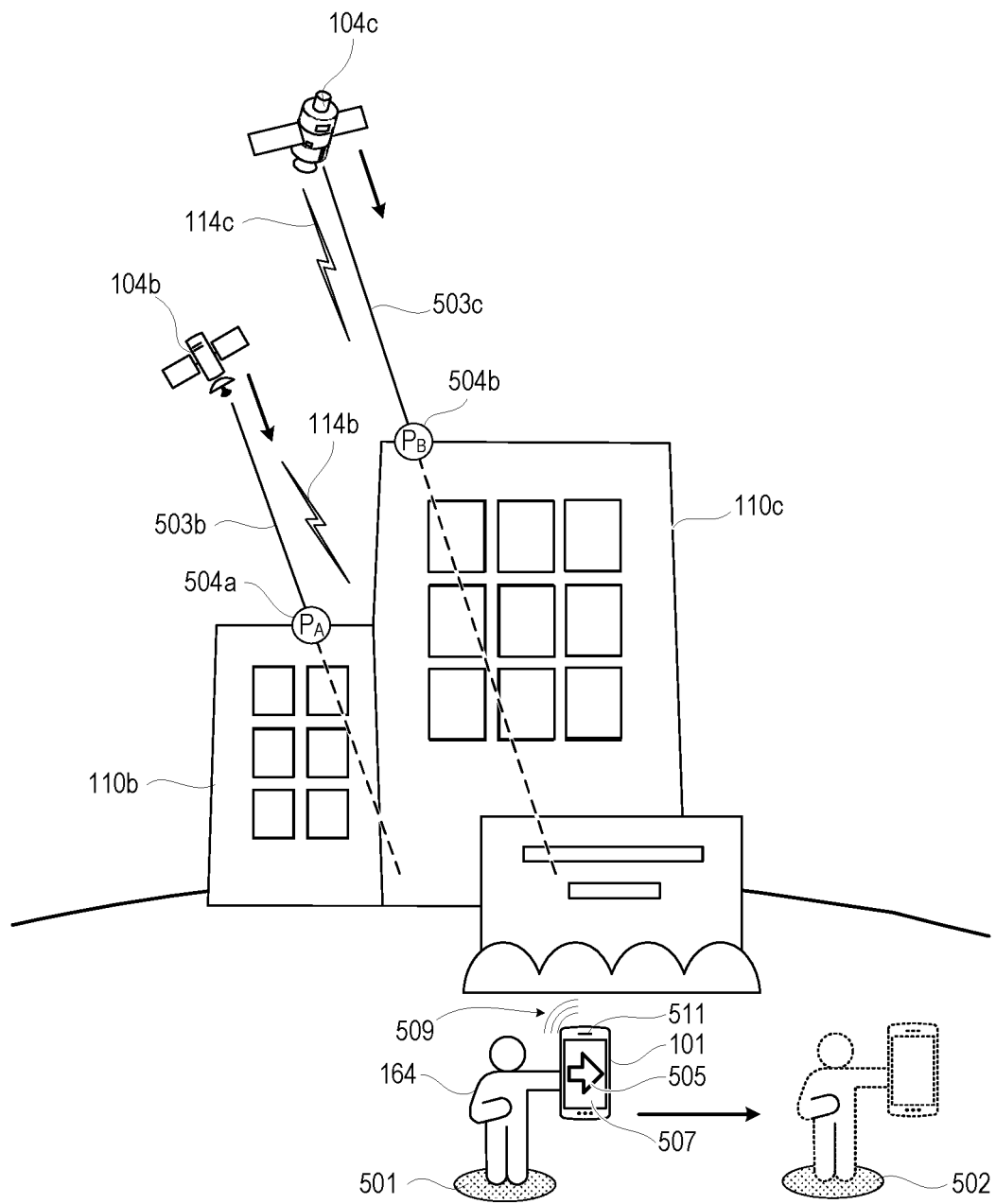
FIG. 5A illustrates a scenario from a first vantage point of a user device at a first location with predicted obstructions to a radio link between the user device and both a serving satellite and a target satellite, according to one or more embodiments.

FIG. 5A illustrates a scenario from a first vantage point of a user device such as communication device 101 at first location 501 with predicted terrain obstructions 110b-110c respectively to radio link 114b with serving satellite 104b and to radio link 114c with target satellite 104c. Communication device 101 tracks orbit 503b of serving satellite 104b which is predicted at spatial point "$P_A$" 504a to be obstructed by terrain obstruction 110b. Communication device 101 tracks orbit 503c of target satellite 104c which is predicted at spatial point "$P_B$" 504b to be obstructed by terrain obstruction 110b. For clarity, only two satellites (104b and 104c) are depicted and are both predicted to be obstructed. In other scenarios, a larger constellation of satellites may be evaluated. In response to predicted radio link failure for all satellites (104b and 104c), communication device 101 evaluates neighboring locations such as second location 502 that would provide coverage by at least one satellite without being obstructed. Communication device 101 may present visual guidance 505 on display 507 or audio guidance 509 on speaker 511 to inform user 164 how to mitigate terrain obstructions 110b-110c by moving to second location 502.

Figure 5B:
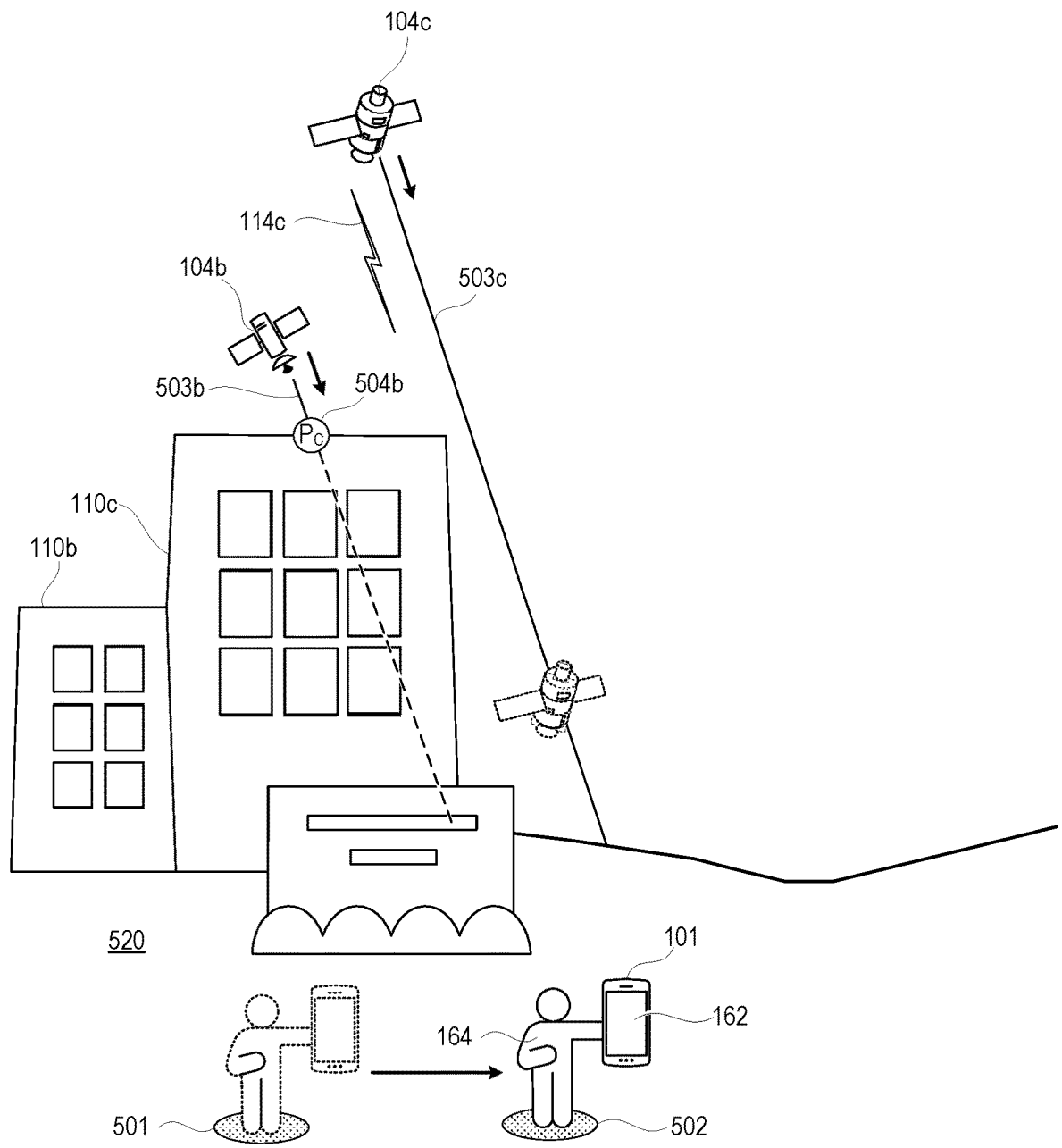
FIG. 5B illustrates the scenario of FIG. 5A from a second vantage point of the user device at a suggested second location that avoids obstruction to a radio link with the target satellite, according to one or more embodiments.

FIG. 5B illustrates the scenario from a second vantage point of communication device 101 at second location 502 that avoids obstruction to radio link 114c with target satellite 104c. Serving satellite 104b is obstructed at third spatial point "$P_C$" 504c by terrain obstruction 110c. Communication device 101 may determine multiple candidate locations to present to user 164 to improve coverage. Ranking of locations may consider factors such as proximity, being on a common thoroughfare to be currently traversed, being along the same prevalent direction of travel, and providing the best signal quality and largest numbers of potential target satellites.

In one or more embodiments, controller 120 (FIG. 1) of communication device 101 determines the three-dimensional coordinates of one or more locations around communication device 101 that are not subject to a prediction of a radio link failure due to a terrestrial obstruction with all target satellites. In one or more embodiments, communication device 101 performs this determination by using the following functionality. First, controller 120 (FIG. 1) determines a respective three-dimensional boundary, as a function of time, of a shadow created by terrain obstruction(s) 110b-110c from a vantage point of each target satellite 104c projected onto geographical surface 520 for each target satellite 104a-104e (FIG. 1). Controller 120 (FIG. 1) ranks one or more locations outside of the shadow of respective target satellites 104a-104e (FIG. 1) based on distance of travel by communication device 101 to the one or more locations. Controller 120 (FIG. 1) selects one or more locations having the highest rank to present at the output device 162. In one or more embodiments, controller 120 may present all of the location options that are possible, with or without the respective ranking, to allow for user selection of a most appropriate option, given the user's own knowledge of his/her movements and/or other factors within the geographic location.

Figure 6:
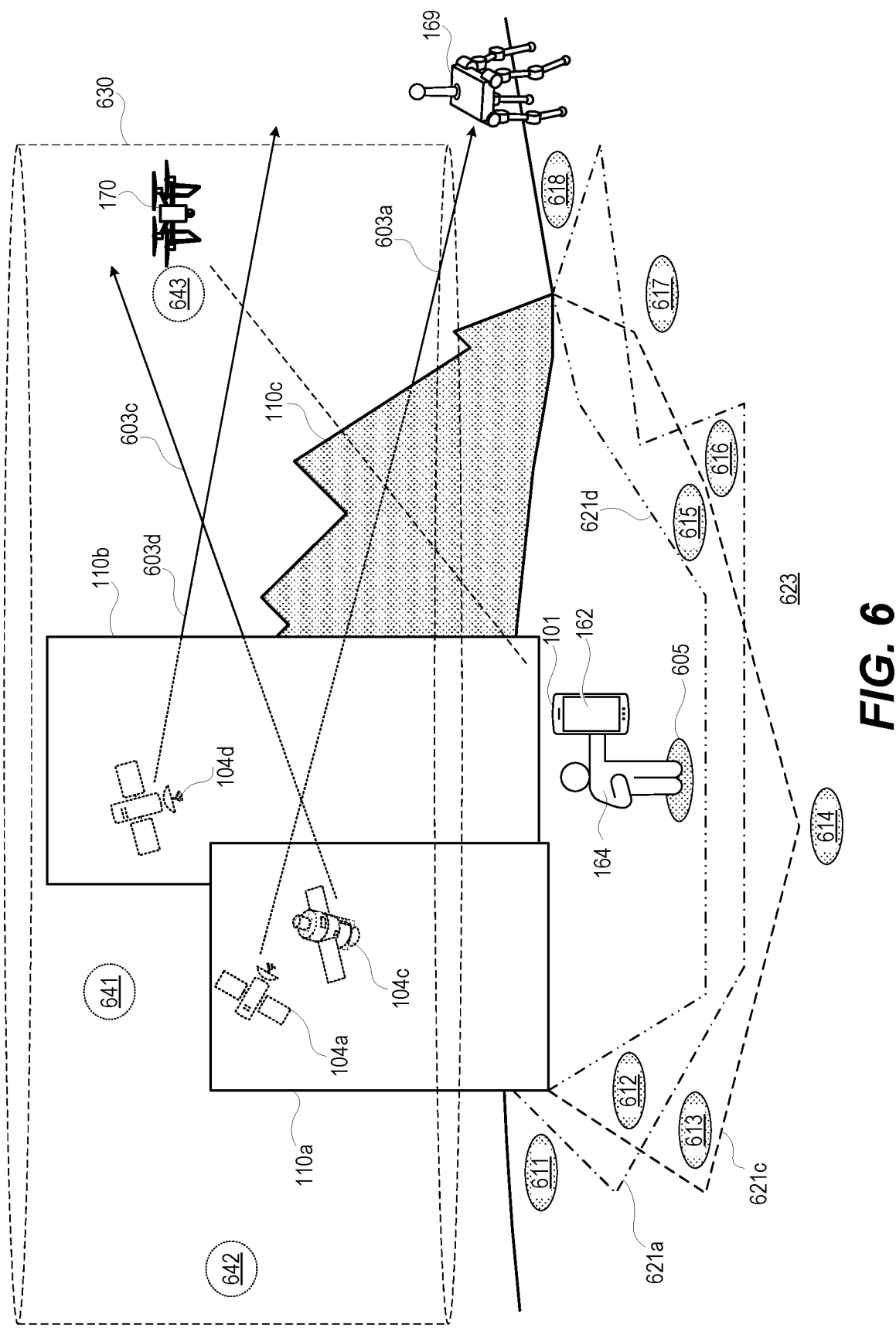
FIG. 6 illustrates a scenario of a user device determining coverage areas of different target satellites that are respectively shadowed and not shadowed by terrain obstructions, according to one or more embodiments.

FIG. 6 illustrates a scenario of communication device 101 determining coverage areas of target satellites 104a, 104c, and 104d that are respectively shadowed and not shadowed by terrain obstructions 110a, 110b, and 110c. In response to a predicted or current radio link failure, communication device 101 identifies target satellites 104a, 104c, and 104d having respective orbits 603a, 603c, and 603d that, absent terrain obstructions, would have corresponding coverage areas that encompasses current location 605 of communication device 101. Communication device 101 may identify target satellites having respective orbits that, absent terrain obstructions, would have corresponding coverage areas that encompasses current location 605 of communication device 101 at one or more future times. Communication device 101 determines the three-dimensional coordinates of one or more locations 611-618 around communication device 101 that are not subject to a prediction of a radio link failure due to terrestrial obstruction 110a, 110b, and 110c with all target satellites 104a, 104c, and 104d. In an example, communication device 101 determines respective three-dimensional boundary 621a, 621c, and 621d as a function of time of a shadow created by terrain obstructions 110a, 110b, and 110c from a vantage point of each target satellite 104a, 104c, and 104d projected onto geographical surface 623 for each target satellite 104a, 104c, and 104d.

In an example, current location 605 is within a current communication shadow of terrain obstacles 110a-110c depicted as boundaries 621a, 621c, and 621d respectively for target satellite 104a, 104c, and 104d. Locations 611-618 are arranged from left to below to right in an arc around current location 605. Location 611 is not within any of boundaries 621a, 621c, and 621d and would provide coverage from all three target satellites 104a, 104c, and 104d. Location 612 is within boundaries 621a and 621c and would provide coverage from target satellite 104d. Location 613 is within boundary 621c and would provide coverage from target satellites 104a and 104d. Location 614 is not within any of boundaries 621a, 621c, and 621d and would provide coverage from all three target satellites 104a, 104c, and 104d. Location 615 is within boundaries 621a and 621c and would provide coverage from target satellite 104d. Location 616 is within boundary 621a and would provide coverage from target satellites 104c and 104d. Locations 617 and 618 are not within any of boundaries 621a, 621c, and 621d and would provide coverage from all three target satellites 104a, 104c, and 104d. Similar boundaries and locations may be predicted for other future times.

Communication device 101 ranks one or more locations outside of the shadow (621a, 621c, and 621d) of respective target satellites 104a, 104c, and 104d based on distance of travel by the communication device 101 to the one or more locations. Communication device 101 selects one or more locations having the highest rank to present at output device 162. Ranking may include one or more factors including: (i) number of target satellites 104a, 104c, and 104d that provide coverage; (ii) distance from current location 605; and (iii) duration that coverage will persist. In one or more embodiments, a navigation application that is presenting a route to a destination at output device 162 may alter the route to maintain communication coverage with the least addition of time or distance to the route.

In one or more embodiments, the ranking may include considering a communication range of terrestrial drone 169 configured to act as satellite communication repeater or relay. Instead of directing user 164 to carry communication device 101 to the location, user 164 may manually control terrestrial drone 169 to the location to act as an RF repeater or relay to maintain satellite communications with communication device 101. In one or more embodiments, communication device 101 automatically directs terrestrial drone 169 to the location to act as a communication relay. Alternatively, or in addition, aerial drone 170 may fly to the location and land to conserve power. Aerial drone 170 acts as an RF repeater or relay to maintain satellite communications. Communication device 101 may only evaluate terrestrial locations that provide satellite communications.

In one or more embodiments, terrestrial drone 169 and aerial drone 170 are self-navigating and only need to be given the terminal location. Communication device 101 may be communicatively connected to terrestrial drone 169 and aerial drone 170 to directly provide the location. Alternatively, or in addition, user 164 may have a separate manual interface for entering the location for terrestrial drone 169 and aerial drone 170. The separate manual interface may be another application executed by communication device 101 or be executed by a separate physical device. In one or more embodiments, terrestrial drone 169 and aerial drone 170 accept driving or pilot commands respectively. Communication device 101 may be communicatively connected to terrestrial drone 169 and aerial drone 170 to directly drive or pilot terrestrial drone 169 and aerial drone 170 respectively to the location. Alternatively, or in addition, user 164 may have a separate manual interface for entering making driving or piloting inputs for terrestrial drone 169 and aerial drone 170. The separate manual interface may be another application executed by communication device 101 or be executed by a separate physical device.

Alternatively, or in addition, communication device 101 may evaluate aerial locations above geographic surface 105 to utilize aerial drone 170 as an RF repeater or relay while airborne. In one or more embodiments, communication device 101 may maintain coverage for satellite communications by using aerial drone 170. When communication device 101 is being shadowed by terrain obstructions 110a-110c from receiving satellite communications, aerial drone 170 may be capable of more quickly reaching a location from which a relay signal is not obstructed and may act as a repeater or relay for the satellite communications signals. Communication device 101 may remain shadowed from satellite communication coverage while aerial drone 170 operates at a location high enough above and/or laterally displaced away from shadows cast by the terrain obstructions to have satellite communication coverage. In addition, aerial drone 170 remains within a line of sight of the user device and within communication range with communication device 101 to relay communications between (i.e., to and from) the satellite and user device. Aerial drone 170 is not confined to geographical surface 520. Vertical locations above geographical surfaces 520 may maintain coverage for satellite communication that would also be above an area of the shadow cast by the obstruction preventing the user device from receiving satellite communication. Aerial drone 170 would likely be able to move quickly into these higher coverage areas much faster than user 164 would be able to relocate on the ground into an unobstructed coverage area. In finding locations for aerial drone 170 to act as a repeater or relay, communication device 101 determines a vertical height and range of aerial drone 170 that is within communication range to communication device 101 to define three-dimensional flight envelope 630. Aerial drone 170 is configured to operate as a communication relay or repeater between target satellites 104a-104c and communication device 101. Communication device 101 determines a respective three-dimensional boundary as a function of time of a shadow created by terrain obstructions 110a-110c from a vantage point of at least one target satellite projected through the three-dimensional flight envelope for each target satellite 104a-104c. Communication device 101 ranks one or more locations 641, 642, and 643 outside of the shadow of respective target satellites 104a-104c based on distance of travel by aerial drone 170 to one or more locations 641-643. In one or more embodiments, locations 641-643 can include locations on geographical surface 623, enabling aerial drone 170 to conserve power by landing. Communication device 101 selects a location having the highest rank to direct aerial drone 170 to the location to act as a communication relay or repeater. In one or more embodiments, aerial drone 170 carries an RF repeater that is controlled by communication device 101 to acquire a particular satellite using antenna beam steering and to retransmit a downlink from the satellite toward the communication device 101. In one or more embodiments, aerial drone 170 carries a relay that receives and amplifies all signals at least within a certain RF band received from at least one target satellite 104a-104c and retransmits the signals toward communication device 101.

Figure 7:
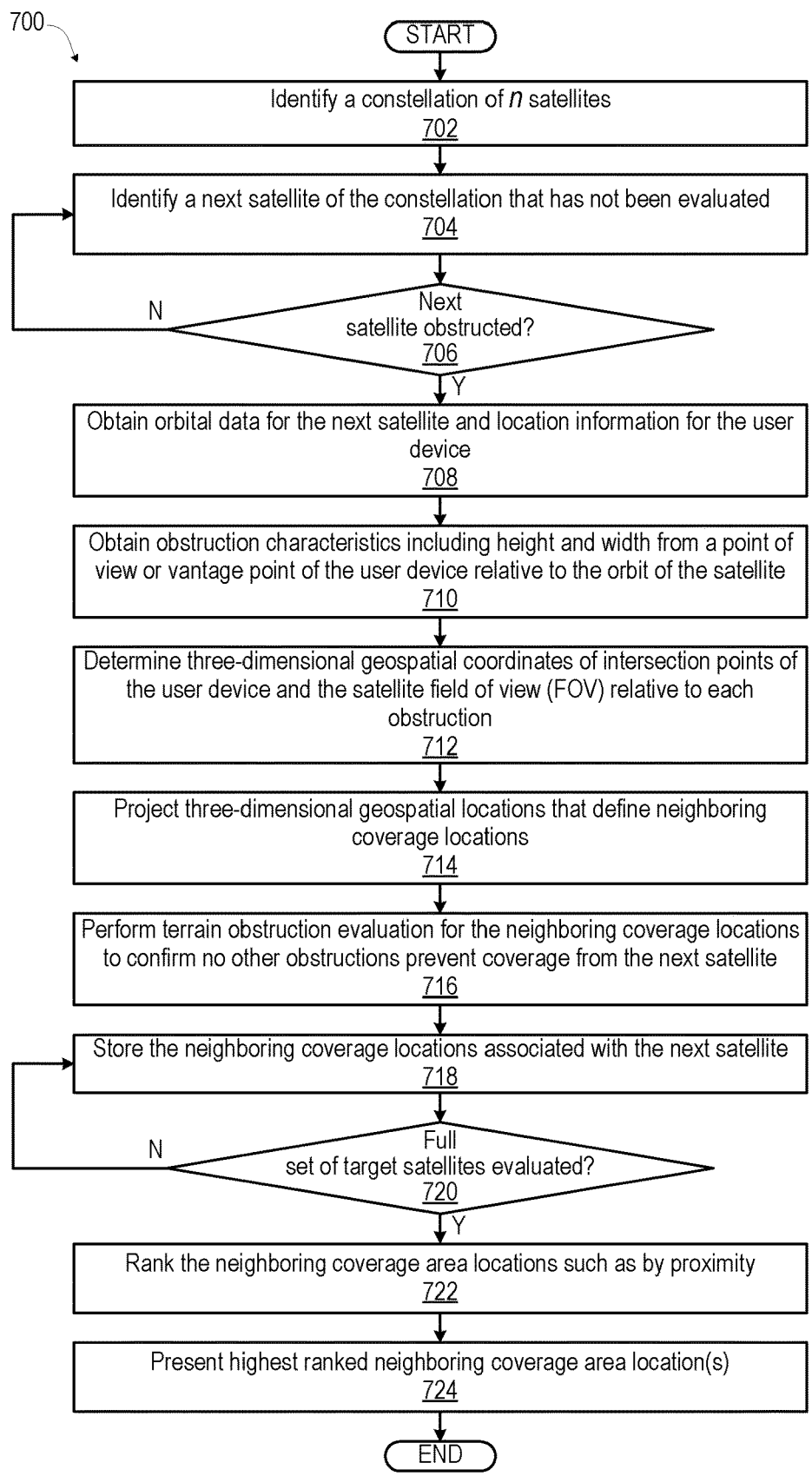
FIG. 7 is a flow diagram presenting a method of determining a highest ranked target satellite from a non-terrestrial network of satellites for communication coverage for a user device, according to one or more embodiments.

FIG. 7 is a flow diagram presenting method 700 of finding, by a user device, better coverage from a non-terrestrial network. Method 700 includes identifying a constellation of n satellites (block 702). Method 700 includes identifying a next satellite of the constellation that has not been evaluated (block 704). Method 700 includes determining whether the next satellite is determined to be obstructed (decision block 706). In an example, each of the satellites has previously been evaluated by method 400 of FIG. 4. In response to determining that the next satellite is not obstructed, method 700 returns to block 704. In response to determining that the next satellite is obstructed, method 700 includes obtaining orbital data for the next satellite and location information for the user device (block 708). Method 700 includes obtaining obstruction characteristics including height and width from a point of view or vantage point of the user device relative to the orbit of the satellite (block 710). Method 700 includes determining three-dimensional geospatial coordinates of intersection points of the user device and the satellite field of view (FOV) relative to each obstruction (block 712). Method 700 includes projecting three-dimensional geospatial locations that define neighboring coverage locations (block 714). The neighboring coverage locations define boundaries between obstructed ("shadowed") areas and unobstructed areas. Method 700 includes performing terrain obstruction evaluation for the neighboring coverage locations to confirm no other obstructions prevent coverage from the next satellite (block 716). Method 700 includes storing the neighboring coverage locations associated with the next satellite (block 718).

Method 700 includes determining whether a full set of target satellites have been evaluated for alternative coverage locations (decision block 720). In response to determining that the full set of target satellites have not been evaluated, method 700 includes returning to block 704. In response to determining that the full set of target satellites has been evaluated, method 700 includes ranking the neighboring coverage area locations, such as by proximity (block 722). Method 700 includes presenting one or more of the highest ranked neighboring coverage area locations (block 724). Then method 700 ends. In one or more embodiments, method 700 is periodically repeated or triggered while a requirement for NTN coverage exists without an available target satellite for a radio link, such as in response to detecting the location of the user device having moved more than a threshold distance.

Figure 8A:
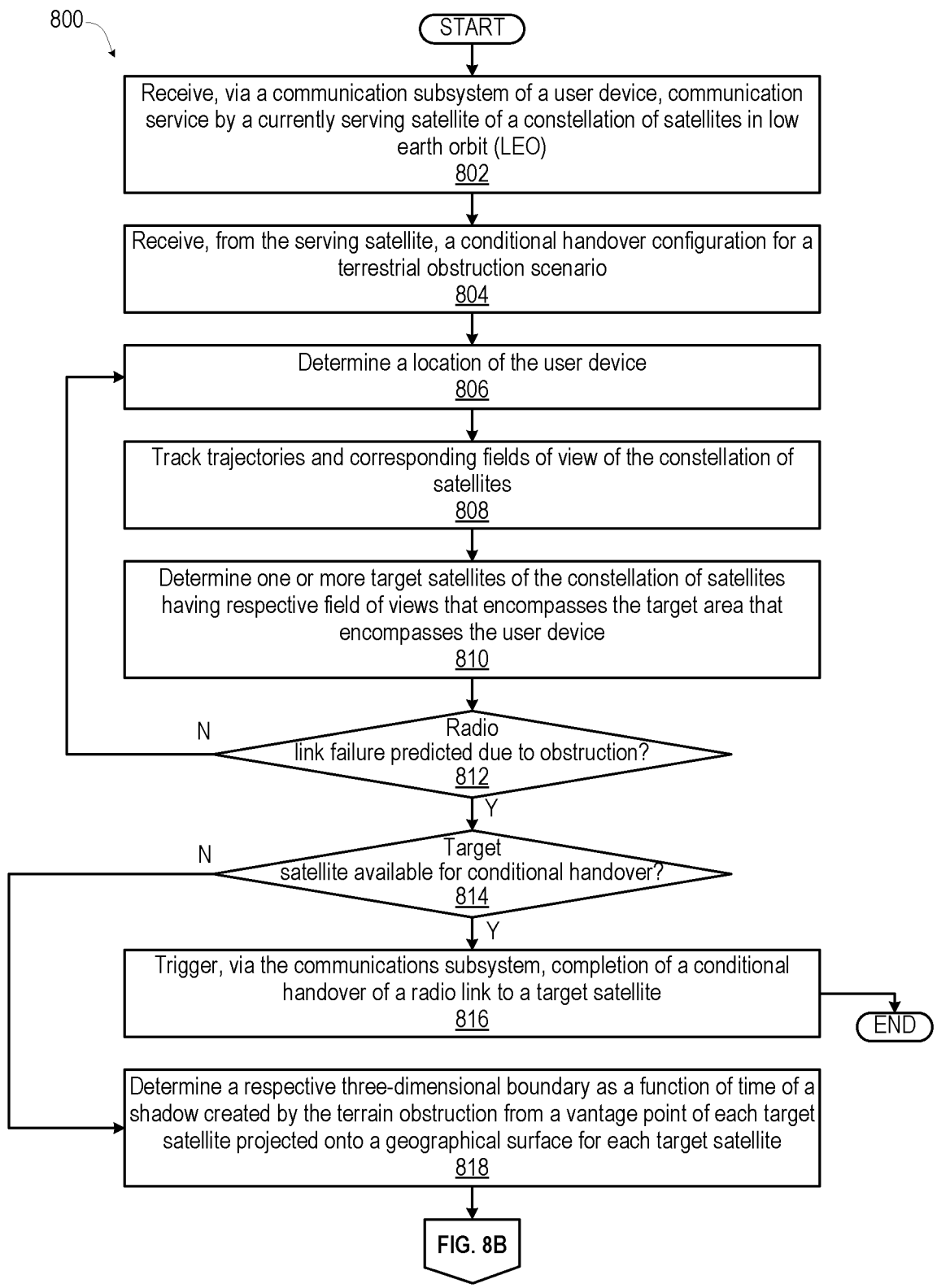
FIGS. 8A-8B (collectively "FIG. 8") are a flow diagram presenting a method of a user device evaluating and completing a conditional handover of a radio link to a target satellite among a constellation of satellites in low earth orbit (LEO) based on predicting a radio link failure due to a terrestrial obstruction, according to one or more embodiments.
Figure 8B:
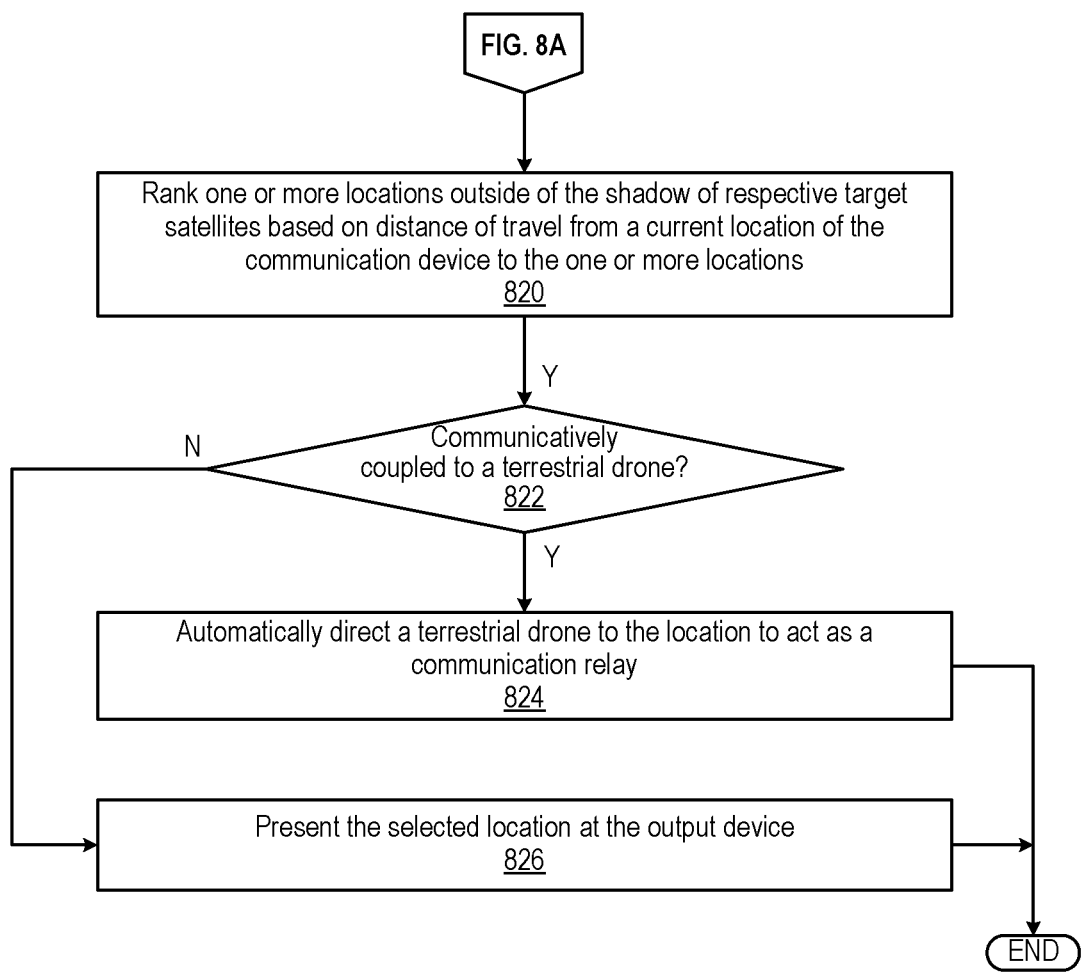

FIGS. 8A-8B (collectively "FIG. 8") are a flow diagram presenting a method by a user device for evaluating and completing a conditional handover of a radio link to a target satellite of a constellation of satellites in low earth orbit (LEO), based on predicting a radio link failure due to a terrestrial obstruction. Method 800 includes receiving, via a communication subsystem of a user device, communication service by a currently serving satellite of a constellation of satellites in low earth orbit (LEO) (block 802). The serving satellite has a field of view encompassing a target area surrounding the user device and is communicatively coupled via an inter-satellite communication system with other satellites. Method 800 includes receiving, from the serving satellite, a conditional handover configuration for a terrestrial obstruction scenario (block 804). Method 800 includes determining a location of the user device (block 806). Method 800 includes tracking trajectories and corresponding fields of view of the constellation of satellites (block 808). Method 800 includes determining one or more target satellites of the constellation of satellites having respective field of views that encompasses the target area that encompasses the user device (block 810). Method 800 includes predicting, based on one or more topological terrain maps, device location, and the movement of a satellite in its orbit towards an obstruction on the terrain map proximate to or within the target area, whether a radio link failure is predicted (decision block 812). The failure occurs due to one or more terrestrial obstructions between the user device and respective ones of the currently serving device and the one or more target satellites that have a field of view encompassing the target area surrounding the user device. In response to determining that a radio link failure is not predicted, method 800 returns to block 806. In response to predicting a radio link failure due to a terrestrial obstruction between the user device and the serving satellite, method 800 includes determining whether a target satellite is available for a conditional handover (decision block 814). In response to determining that a target satellite is available, method 800 includes triggering, via the communications subsystem, completion of a conditional handover of a radio link to a target satellite that is not predicted to have a radio link failure due to a terrestrial obstruction (block 816). Then method 800 ends. In response to determining that a target satellite is not available in decision block 814, method 800 includes determining a respective three-dimensional boundary as a function of time of a shadow created by the terrain obstruction from a vantage point of each target satellite projected onto a geographical surface for each target satellite (block 818). Then method 800 proceeds to block 820 of FIG. 8B.

With reference to FIG. 8B, method 800 includes ranking one or more locations outside of the shadow of respective target satellites based on distance of travel from a current location of the communication device to the one or more terrestrial (on the ground) locations (block 820). Method 800 includes determining whether the communication device is communicatively coupled to a terrestrial drone (decision block 822). In response to determining that the communication device is communicatively coupled to a terrestrial drone, method 800 includes identifying a best location among the ranked locations based on the distance or time of travel of the drone to the different locations and availability of a landing area for the drone to land. Method 800 includes automatically directing the terrestrial drone to travel to and land at the identified best location, where the drone lands on the surface of the ground or appropriate structure and commences to act as a communication relay (block 824). Then method 800 ends. In response to determining that the communication device is not communicatively coupled to a terrestrial drone, method 800 includes presenting the selected highest ranked location(s) at the output device to facilitate the user navigating/moving to the location with the user device (block 826). In one or more embodiments, the user has a manual controller for the aerial drone. With the benefit of the location presented by the communication device, the user may manually control the aerial drone using the manual controller to fly to the location to act as an RF repeater or relay. In an example, the manual controller may be an application executed by the communication device. In another example, the manual controller may be a separate physical device from the communication device. Then method 800 ends.

In one or more embodiments, method 800 includes receiving a second conditional handover configuration for a downlink signal measurement-based scenario from the serving satellite, the second conditional handover based on a prediction that the user device will exit the field of view encompassing the target area. Method 800 includes, in response to the second conditional handover configuration, measuring a signal characteristic of a downlink signal from the serving satellite. In response to predicting, based on the signal characteristic, that the serving satellite is exiting the field of view encompassing the target area, method 800 includes triggering, via the communications subsystem, completion of a conditional handover of a radio link to a target satellite whose communication signal is not predicted to be blocked by a terrestrial obstruction.

In one or more embodiments, method 800 includes determining three-dimensional geographic coordinates of one or more locations around the user device that are not subject to a prediction of a radio link failure due to a terrestrial obstruction with all target satellites. Method 800 includes presenting at least one of the determined three-dimensional geographic coordinates at an output device of the user device or an output device that is communicatively coupled to the user device. In one or more particular embodiments, method 800 includes presenting, at the output device, navigational guidance toward the at least one three-dimensional geographic coordinates, in response to one of predicting a radio link failure or identifying a radio link failure due to one or more terrestrial obstructions between the user device and each of the serving satellite and the one or more target satellites.

In one or more embodiments, method 800 includes ranking the target satellites based on duration of availability due to trajectory and terrestrial obstructions. Method 800 includes triggering, via the communications subsystem, completion of the conditional handover of a radio link to a target satellite identified as having a longest duration of availability.

Figure 9A:
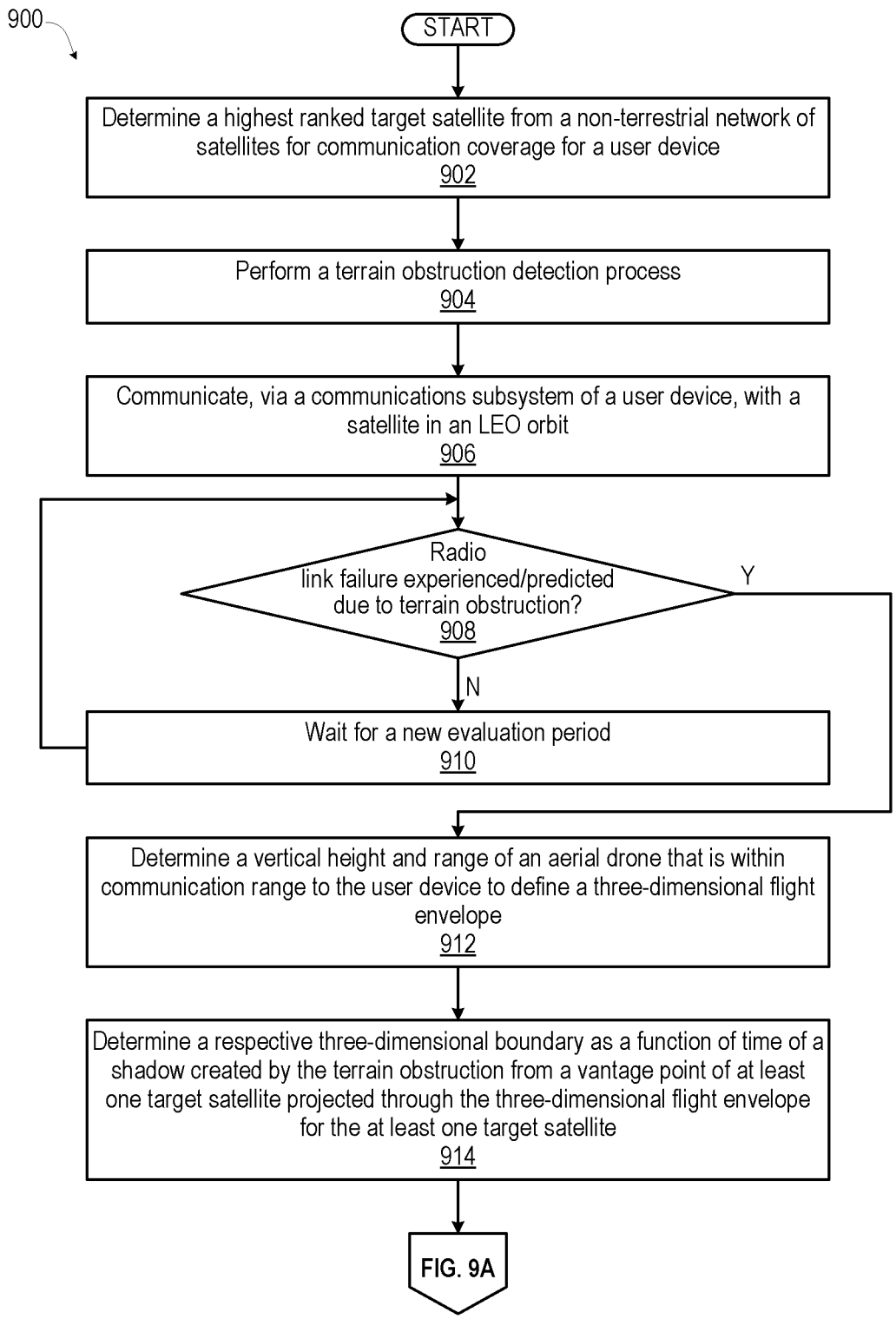
FIGS. 9A-9B (collectively "FIG. 9") are a flow diagram presenting a method of directing an aerial drone configured as an RF relay to a location not obstructed by terrain to maintain communication between a satellite and the user device, according to one or more embodiments.
Figure 9B:
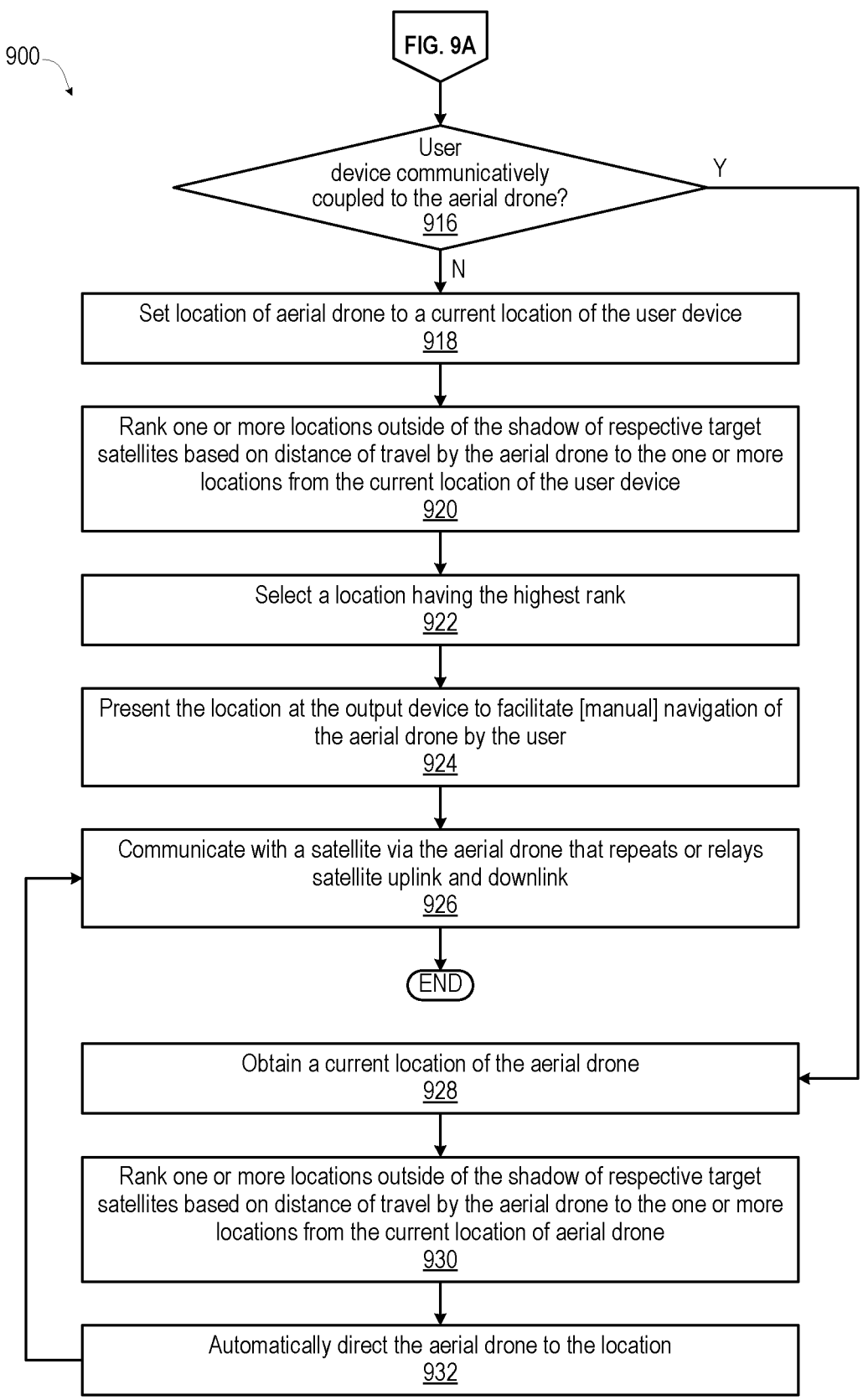

FIGS. 9A-9B (collectively "FIG. 9") are a flow diagram presenting method 900 of directing an aerial drone, configured as an RF relay, to a location not obstructed by terrain to maintain communication between a satellite and the user device. Method 900 provides an alternate mitigation process for the user device being shadowed by terrain obstructions. As used herein specific to method 900, the particular boundaries of a shadow effecting the user device are not being evaluated. Shadowing by terrain obstructions are being evaluated as effecting an aerial drone capable of acting as RF communication repeater or relay. Distances for communication range in question relate to how far away the aerial drone can be from the user device for effective communication signal strength. Terrain obstructions between the user device and the aerial drone may be considered in defining a three-dimensional flight envelope. In example, a skyscraper building that is taller than the operating range of the defines an outer bound of the flight envelope. With reference to FIG. 9A, method 900 includes determining a highest ranked target satellite from a non-terrestrial network of satellites for communication coverage for a user device (block 902). An example of determining the highest rank target satellite is as described above with regard to method 700 (FIG. 7). With continued reference to FIG. 9A, method 900 includes performing a terrain obstruction detection process (block 904). An example of the terrain obstruction detection process is described above with regard to method 400 (FIG. 4). With continued reference to FIG. 9A, method 900 includes communicating, via a communications subsystem of a user device, with a satellite in an LEO orbit (block 906). Method 900 includes determining whether a current location of the user device has experienced, or is predicted to experience, a radio link failure due to terrain obstruction(s) (decision block 908). In response to determining that the current location of the user device has not experienced, and is not predicted to experience, a radio link failure due to terrain obstruction(s), method 900 includes waiting for a new evaluation period (block 910). Then method 900 returns to block 908. In response to determining that the current location of the user device has experienced, or is predicted to experience, a radio link failure due to terrain obstruction(s), method 900 includes determining a vertical height and range of an aerial drone that is within communication range to the user device to define a three-dimensional flight envelope (block 912). The aerial drone is pre-configured as a communication relay between a satellite and the user device. Method 900 includes determining a respective three-dimensional boundary as a function of time of a shadow created by the terrain obstruction from a vantage point of at least one target satellite projected through the three-dimensional flight envelope for the at least one target satellite (block 914). Then method 900 proceeds to decision block 916 of FIG. 9B.

With reference to FIG. 9B, method 900 includes determining whether the user device is communicatively coupled to the aerial drone (decision block 916). In response to determining that the user device is not communicatively coupled to the aerial drone, method 900 includes setting location of aerial drone to a current location of the user device (block 918). Method 900 includes ranking one or more locations outside of the shadow of respective target satellites based on distance of travel by the aerial drone to the one or more locations from the current location of the user device (block 920). Method 900 includes selecting a location having the highest rank (block 922). Method 900 includes presenting the location at the output device to facilitate manual navigation of the aerial drone by the user (block 924). Method 900 includes communicating with a satellite via the aerial drone that repeats or relays satellite uplink and downlink until the satellite is no longer blocked by the terrestrial obstruction (block 926). Then method 900 ends. In response to determining that the user device is communicatively coupled to the aerial drone in decision block 916, method 900 includes obtaining a current location of the aerial drone (block 928). Method 900 includes ranking one or more locations outside of the shadow of respective target satellites based on distance of travel by the aerial drone to the one or more locations from the current location of aerial drone (block 930). Method 900 includes automatically directing the aerial drone to the location (block 932). Then method 900 returns to block 926.

In one or more embodiments, aerial drone 170 includes second communication device 101 having some or all of the capabilities of communication device 101 carried by user 164. Aerial drone 170 may perform tracking of satellites and predictions of terrain obstructions on behalf of communication device 101 carried by user 164.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A user device comprising:
a communications subsystem communicatively connectable to a constellation of satellites in low earth orbit (LEO), each satellite configured to provide data communication services to the user device while the user device is within a field of view of a respective satellite, the satellites communicatively coupled via an inter-satellite communication system with other satellites;
a memory that stores one or more topological terrain maps comprising terrestrial obstructions that can cause radio link failure between the user device and a satellite; and
a controller communicatively coupled to the communications subsystem and the memory, and which:
receives communication service by a serving satellite of the constellation having a field of view encompassing a target area surrounding the user device;
determines a location of the user device;
tracks trajectories and corresponding fields of view of the constellation of satellites;
determines one or more target satellites of the constellation of satellites having respective field of views that encompasses a target area that encompasses the user device;
predicts, based on the one or more topological terrain maps, device location and movement of a satellite in orbit towards an obstruction on the terrain map, whether a radio link failure will occur due to one or more terrestrial obstructions between the user device and respective ones of a currently serving satellite and the one or more target satellites that have a field of view encompassing the target area surrounding the user device; and
in response to predicting a radio link failure due to a terrestrial obstruction between the user device and the serving satellite, triggers, via the communications subsystem, completion of a conditional handover of a radio link to a target satellite that is not predicted to have a radio link failure due to a terrestrial obstruction.

2. The user device of claim 1, wherein, prior to predicting the radio link failure due to one or more terrestrial obstructions, the controller:
receives a conditional handover configuration for a terrestrial obstruction scenario from the serving satellite; and
determines whether a radio link failure is predicted to occur due to one or more terrestrial obstructions between the user device and respective ones of a currently serving satellite and the one or more target satellites subsequent to receiving the conditional handover configuration for a terrestrial obstruction scenario from the serving satellite.

3. The user device of claim 2, wherein the controller:
receives a second conditional handover configuration for a downlink signal measurement-based scenario from the serving satellite, the second conditional handover based on a prediction that the user device will exit the field of view encompassing the target area;
measures a signal characteristic of a downlink signal from the serving satellite, in response to the second conditional handover configuration; and
in response to predicting, based on the signal characteristic, that the serving satellite is exiting the field of view encompassing the target area, triggers, via the communications subsystem, completion of a conditional handover of a radio link to a target satellite whose communication signal is not predicted to be blocked by a terrestrial obstruction.

4. The user device of claim 1, further comprising an output device communicatively coupled to the controller, and wherein the controller:
determines three-dimensional geographic coordinates of one or more locations around the user device that are not subject to a prediction of a radio link failure due to a terrestrial obstruction with all target satellites; and
presents at least one of the determined three-dimensional geographic coordinates at the output device.

5. The user device of claim 4, wherein, in determining the three-dimensional coordinates of one or more locations around the user device that are not subject to a prediction of a radio link failure due to a terrestrial obstruction with all target satellites, the controller:
determines a respective three-dimensional boundary as a function of time of a shadow created by the terrain obstruction from a vantage point of each target satellite projected onto a geographical surface for each target satellite;
ranks one or more locations outside of the shadow of respective target satellites based on distance of travel by the user device to the one or more locations; and
selects one or more locations having the highest rank to present at the output device to at least one of: (i) present at the output device to facilitate manual direction of a terrestrial drone; and (ii) automatically direct a terrestrial drone to the location to act as a communication relay.

6. The user device of claim 4, wherein, in determining the three-dimensional coordinates of one or more locations around the user device that are not subject to a prediction of a radio link failure due to a terrestrial obstruction with all target satellites, the controller:
determines a vertical height and range of an aerial drone that is within communication range to the user device to define a three-dimensional flight envelope of the aerial drone, the aerial drone configured to operate as a communication relay between a satellite and the user device;
determines a respective three-dimensional boundary as a function of time of a shadow created by the terrain obstruction from a vantage point of at least one target satellite projected through the three-dimensional flight envelope of the aerial drone;

ranks one or more locations that provides a reflected/redirected communication path outside of the shadow of the at least one target satellite based on at least one of distance of travel by the aerial drone to the one or more locations and length of time aerial drone coverage is required to support the communication; and selects a location having the highest rank to at least one of: (i) present at the output device to facilitate manual direction of the aerial drone; and (ii) automatically direct the aerial drone to the location to act as a communication relay.

7. The user device of claim 4, wherein the controller presents guidance toward the at least one three-dimensional geographic coordinates at the output device in response to one of predicting a radio link failure or identifying a radio link failure due to one or more terrestrial obstructions between the user device and each of the serving satellite and the one or more target satellites.

8. The user device of claim 1, wherein the controller:
ranks the target satellites based on duration of availability due to trajectory and terrestrial obstructions; and
triggers, via the communications subsystem, completion of the conditional handover of a radio link to a target satellite identified as having a longest duration of availability.

9. A method comprising:
receiving, via a communication subsystem of a user device, communication service by a currently serving satellite of a constellation of satellites in low earth orbit (LEO), the serving satellite having a field of view encompassing a target area surrounding the user device and communicatively coupled via an inter-satellite communication system with other satellites;
determining a location of the user device;
tracking trajectories and corresponding fields of view of the constellation of satellites;
determining one or more target satellites of the constellation of satellites having respective field of views that encompasses the target area that encompasses the user device;
predicting, based on one or more topological terrain maps, device location and movement of a satellite in its orbit towards an obstruction on the terrain map, whether a radio link failure is predicted to occur due to one or more terrestrial obstructions between the user device and respective ones of the currently serving device and the one or more target satellites that have a field of view encompassing the target area surrounding the user device; and
in response to predicting a radio link failure due to a terrestrial obstruction between the user device and the serving satellite, triggering, via the communications subsystem, completion of a conditional handover of a radio link to a target satellite that is not predicted to have a radio link failure due to a terrestrial obstruction.

10. The method of claim 9, further comprising:
prior to predicting the radio link failure due to one or more terrestrial obstructions, receiving a conditional handover configuration for a terrestrial obstruction scenario from the serving satellite; and
determining whether a radio link failure is predicted to occur due to one or more terrestrial obstructions between the user device and respective ones of a currently serving satellite and the one or more target satellites subsequent to receiving the conditional handover configuration for a terrestrial obstruction scenario from the serving satellite.

11. The method of claim 10, further comprising:
receiving a second conditional handover configuration for a downlink signal measurement-based scenario from the serving satellite, the second conditional handover based on a prediction that the user device will exit the field of view encompassing the target area;
measuring a signal characteristic of a downlink signal from the serving satellite, in response to the second conditional handover configuration; and
in response to predicting, based on the signal characteristic, that the serving satellite is exiting the field of view encompassing the target area, triggering, via the communications subsystem, completion of a conditional handover of a radio link to a target satellite whose communication signal is not predicted to be blocked by a terrestrial obstruction.

12. The method of claim 9, further comprising:
determining three-dimensional geographic coordinates of one or more locations around the user device that are not subject to a prediction of a radio link failure due to a terrestrial obstruction with all target satellites; and
presenting at least one of the determined three-dimensional geographic coordinates at an output device that is communicatively coupled to the user device.

13. The method of claim 12, wherein determining the three-dimensional coordinates of one or more locations around the user device that are not subject to a prediction of a radio link failure due to a terrestrial obstruction with all target satellites comprises:
determining a respective three-dimensional boundary as a function of time of a shadow created by the terrain obstruction from a vantage point of each target satellite projected onto a geographical surface for each target satellite;
ranking one or more locations outside of the shadow of respective target satellites based on distance of travel by the user device to the one or more locations; and
selecting one or more locations having highest rank to present at the output device to at least one of: (i) present at the output device to facilitate manual direction of a terrestrial drone; and (ii) automatically direct a terrestrial drone to the location to act as a communication relay.

14. The method of claim 12, wherein determining the three-dimensional coordinates of one or more locations around the user device that are not subject to a prediction of a radio link failure due to a terrestrial obstruction with all target satellites comprises:
determining a vertical height and range of an aerial drone that is within communication range to the user device to define a three-dimensional flight envelope, the aerial drone configured as a communication relay between a satellite and the user device;
determining a respective three-dimensional boundary as a function of time of a shadow created by the terrain obstruction from a vantage point of each target satellite projected through the three-dimensional flight envelope for each target satellite;
ranking one or more locations outside of the shadow of respective target satellites based on distance of travel by the aerial drone to the one or more locations; and
selecting a location having the highest rank to at least one of: (i) present at the output device to facilitate manual direction of the aerial drone; and (ii) automatically direct the aerial drone to the location to act as a communication relay.

15. The method of claim 12, further comprising presenting guidance toward the at least one three-dimensional geographic coordinates at the output device in response to one of predicting a radio link failure or identifying a radio link failure due to one or more terrestrial obstructions between the user device and each of the serving satellite and the one or more target satellites.

16. The method of claim 9, further comprising:
ranking the target satellites based on duration of availability due to trajectory and terrestrial obstructions; and
triggering, via the communications subsystem, completion of the conditional handover of a radio link to a target satellite identified as having a longest duration of availability.

17. A computer program product comprising:
a non-transitory computer readable storage device; and
program code on the computer readable storage device that when executed by a processor associated with a user device, the program code enables the user device to provide functionality of:
receiving, via a communication subsystem of the user device, communication service by a currently serving satellite of a constellation of satellites in low earth orbit (LEO), the serving satellite having a field of view encompassing a target area surrounding the user device and communicatively coupled via an inter-satellite communication system with other satellites;
determining a location of the user device;
tracking trajectories and corresponding fields of view of the constellation of satellites; determining one or more target satellites having respective field of views that encompasses the target area that encompasses the user device;
predicting, based on one or more topological terrain maps, device location and movement of a satellite in its orbit towards an obstruction on the terrain map, whether a radio link failure is predicted to occur due to one or more terrestrial obstructions between the user device and respective ones of the currently serving device and the one or more target satellites that have a field of view encompassing the target area surrounding the user device; and
in response to predicting a radio link failure due to a terrestrial obstruction between the user device and the serving satellite, triggering, via the communications subsystem, completion of a conditional handover of a radio link to a target satellite that is not predicted to have a radio link failure due to a terrestrial obstruction.

18. The computer program product of claim 17, wherein the program code enables the user device to provide functionality of:
prior to predicting the radio link failure due to one or more terrestrial obstructions, receiving a conditional handover configuration for a terrestrial obstruction scenario from the serving satellite; and
determining whether a radio link failure is predicted to occur due to one or more terrestrial obstructions between the user device and respective ones of a currently serving satellite and the one or more target satellites subsequent to receiving the conditional handover configuration for a terrestrial obstruction scenario from the serving satellite.

19. The computer program product of claim 18, wherein the program code enables the user device to provide functionality of:
receiving a second conditional handover configuration for a downlink signal measurement-based scenario from the serving satellite, the second conditional handover based on a prediction that the user device will exit the field of view encompassing the target area;
measuring a signal characteristic of a downlink signal from the serving satellite in response to the second conditional handover configuration; and
in response to predicting, based on the signal characteristic, that the serving satellite is exiting the field of view encompassing the target area, triggering, via the communications subsystem, completion of a conditional handover of a radio link to a target satellite whose communication signal is not predicted to be blocked by a terrestrial obstruction.

20. The computer program product of claim 17, wherein the program code enables the user device to provide functionality of:
determining three-dimensional geographic coordinates of one or more locations around the user device that are not subject to a prediction of a radio link failure due to a terrestrial obstruction with all target satellites; and
presenting at least one of the determined three-dimensional geographic coordinates at an output device that is communicatively coupled to the user device.

* * * * *